United States Patent
Melpignano (10) Patent No.: US 7,471,629 B2
(45) Date of Patent: Dec. 30, 2008

(54) METHOD AND SYSTEM FOR ADMISSION CONTROL IN COMMUNICATION NETWORKS, RELATED NETWORK AND COMPUTER PROGRAM PRODUCT THEREFOR

(75) Inventor: Diego Melpignano, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 674 days.

(21) Appl. No.: 11/041,507

(22) Filed: Jan. 21, 2005

(65) Prior Publication Data

US 2005/0220019 A1    Oct. 6, 2005

(30) Foreign Application Priority Data

Jan. 26, 2004   (EP)   ................... 04001540

(51) Int. Cl.
*G01R 31/08* (2006.01)
(52) U.S. Cl. .................................................. 370/232
(58) Field of Classification Search ............ 370/395.65, 370/230, 230.1, 231, 232, 233, 234, 395.2, 370/395.21, 395.3; 709/220–226
See application file for complete search history.

(56) References Cited

U.S. PATENT DOCUMENTS

| | | | | |
|---|---|---|---|---|
| 5,761,191 A | 6/1998 | VanDervort et al. | .......... | 370/232 |
| 5,987,331 A | 11/1999 | Grube et al. | ............... | 455/509 |
| 6,028,851 A | 2/2000 | Persson et al. | ............... | 370/329 |
| 6,069,871 A | 5/2000 | Sharma et al. | ............... | 370/209 |
| 6,259,916 B1 | 7/2001 | Bourk et al. | ................. | 455/434 |
| 6,292,484 B1 | 9/2001 | Oliver | ......................... | 370/389 |
| 6,456,849 B1 | 9/2002 | Purnadi et al. | ............... | 455/453 |
| 6,526,281 B1 | 2/2003 | Gorsuch et al. | ............. | 455/452 |
| 6,606,482 B1 | 8/2003 | Wheeler | ..................... | 455/11.1 |
| 6,636,497 B1 | 10/2003 | Honkasalo et al. | .......... | 370/335 |

(Continued)

FOREIGN PATENT DOCUMENTS

EP    0 837 616 A2    4/1998

(Continued)

OTHER PUBLICATIONS

"Wireless LAN Medium Access Control (MAC) and Physical Layer (PHY) specifications—Part 11: Wireless LAN Medium Access Control (MAC) and Physical Layer (PHY) Specifications", International Standard ISO/IEC 8802-11, 1999 edition.

(Continued)

*Primary Examiner*—Chirag G Shah
*Assistant Examiner*—Nima Mahmoudzadeh
(74) *Attorney, Agent, or Firm*—Lisa K. Jorgenson; Timothy L. Boller; Seed IP Law Group PLLC (57) ABSTRACT

A system for admission control in a wireless local area network adapted to serve a set of stations and manage real time transmission as well as and TCP/IP sessions includes an access point (AP) configured for: when either a new station joins the network or a new TCP/IP session is being initiated, checking if sufficient bandwidth is available in the network for the new traffic flow associated with the new station or TCP/IP session without interfering with any ongoing real time transmission in the network, and in case no sufficient bandwidth is found to be available, whereby said new traffic flow could interfere with said ongoing real time transmission, blocking such new traffic flow.

47 Claims, 5 Drawing Sheets

U.S. PATENT DOCUMENTS

| | | | |
|---|---|---|---|
| 6,791,962 B2 * | 9/2004 | Wentink | 370/338 |
| 7,039,032 B1 * | 5/2006 | Ho et al. | 370/338 |
| 2002/0075844 A1 | 6/2002 | Hagen | 370/351 |
| 2002/0093930 A1 | 7/2002 | Dertz et al. | 370/337 |
| 2002/0093948 A1 | 7/2002 | Dertz et al. | 370/355 |
| 2002/0119783 A1 | 8/2002 | Bourlas et al. | 455/453 |
| 2003/0002450 A1 | 1/2003 | Jalali et al. | 370/294 |
| 2003/0032433 A1 | 2/2003 | Daniel et al. | 455/452 |
| 2003/0033435 A1 | 2/2003 | Hanner | 709/247 |
| 2003/0112784 A1 | 6/2003 | Lohtia et al. | 370/342 |
| 2003/0119527 A1 | 6/2003 | Labun et al. | 455/456 |
| 2003/0129988 A1 | 7/2003 | Lee et al. | 455/450 |
| 2004/0004968 A1 | 1/2004 | Nassar | 370/401 |
| 2004/0008627 A1 | 1/2004 | Garg et al. | 370/235 |
| 2004/0100903 A1 * | 5/2004 | Han et al. | 370/230 |

FOREIGN PATENT DOCUMENTS

| | | |
|---|---|---|
| EP | 0 913 968 A1 | 5/1999 |
| EP | 1 049 293 A1 | 11/2000 |
| EP | 1 049 298 A2 | 11/2000 |
| EP | 1 117 211 A2 | 7/2001 |
| EP | 1 150 523 A2 | 10/2001 |
| EP | 1 326 377 A2 | 7/2003 |
| EP | 1 343 282 A1 | 9/2003 |
| WO | WO 01/56228 A2 | 8/2001 |
| WO | WO 02/07388 A2 | 1/2002 |
| WO | WO 02/37730 A2 | 5/2002 |
| WO | WO 02/067613 A2 | 8/2002 |

OTHER PUBLICATIONS

Comer, Douglas E., *Internetworking With Tcp/Ip Volume 1: Principles, Protocols, And Architecture*, 4th ed., Prentice Hall, Upper Saddle River, New Jersey, 2000.

Rasheed et al., "High-Quality Medial Distribution in the Digital Home," *Intel Technology Journal* 6(4):17-29, 2002.

\* cited by examiner

METHOD AND SYSTEM FOR ADMISSION CONTROL IN COMMUNICATION NETWORKS, RELATED NETWORK AND COMPUTER PROGRAM PRODUCT THEREFOR

BACKGROUND OF THE INVENTION

1. Field of the Invention

The present disclosure relates to techniques for admission control in communication networks. In particular, the disclosure pays specific attention to the possible application to local area networks (LANs) such as, e.g., a wireless LAN.

The disclosure is also adapted for use, e.g., in non-wireless networks (such as the Ethernet), other types of wireless networks (UltraWideBand), or mobile telephone networks including terminals equipped with a WLAN interface.

2. Description of the Related Art

Wireless LANs (WLANs) are becoming increasingly popular not just for data transmission but also for real time streaming applications.

WLANs are being increasingly introduced in domestic environments mainly for sharing access to a broadband Internet connection. IEEE802.11b (see IEEE802.1Ib standard, "Wireless LAN Medium Access Control (MAC) and Physical Layer (PHY) specifications", 1999 edition) running at 11 Mbps is widely used nowadays, while higher speed IEEE802.11g at 54 Mbps is being gradually introduced. Consumer electronics manufacturers also are interested in using a domestic WLAN to distribute audiovisual content among entertainment devices and PC's.

However, none of the above-mentioned standards has been developed to support streaming services, which require strict quality of service (QoS) guarantees in terms of delay and delay variation.

The lack of quality of service (QoS) support at the MAC (Medium Access Control) layer of existing WLANs makes audio video streaming particularly sensitive to interfering data traffic.

Streaming media over a Wireless LAN is relatively simple in the ideal case of a channel with a limited error rate and without interference. In practice, however, the attenuation of the signal caused by walls and multipath effects of a closed environment such as a home environment sometimes result in a high (and variable) bit error rate. Furthermore, as wireless equipment in the 2.4 and 5 GHz ISM bands is becoming commonplace, multiple users may be sharing the same radio spectrum in an uncoordinated way, thereby producing mutual interference.

The consequence of transmission errors and interference thus generated is twofold.

Firstly, the need of re-transmitting frames causes bandwidth waste.

Secondly, such retransmissions increase the jitter of frames that arrive at the receiver of a real-time flow: a bigger buffer is therefore needed to compensate for the ensuing delay variations.

BRIEF SUMMARY OF THE INVENTION

Given the great and growing interest for streaming services such as, e.g., WLAN-based A/V (audio/video) streaming, the high number of legacy devices without QoS support already in the market and the uncertain path towards QoS-enabled applications in the home, a basic need exists for simple solutions for a "better-than-best-effort" service to A/V streams in existing networks such as WLANs.

More to the point, the need is felt for arrangements that:

should not require changes in the applications that manage A/V streaming, use existing and emerging standards such as, e.g., WLAN standards without explicit QoS support at the MAC layer, and have a limited complexity.

According to an embodiment of the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. As used herein, the terms "computer" and "processor" also encompass, i.e., embedded devices such as access points, home gateways or set-top boxes. Reference to "at least one computer" is evidently intended to highlight the possibility for the present invention to be implemented in a distributed/modular fashion.

A preferred embodiment of the invention thus provides an arrangement for WLAN AN streaming that does not require any explicit signaling among devices. Conversely, in a preferred embodiment of the arrangement described herein, the WLAN access point constantly monitors all the traffic among stations and autonomously understands the priority of each flow (real time vs. data streams).

In that way, a user-defined admission control policy can be applied each time a new traffic flow is detected by the AP, which may result in the new traffic flow not being serviced by the AP. This policy leaves more bandwidth available for the privileged traffic flows like real time flows. When a new mobile station joins the WLAN or a new TCP/IP session is being initiated, the AP checks if there is sufficient bandwidth for all the traffic flows. In case of congestion, i.e., when the new traffic flow could hamper an ongoing real time transmission, the AP may drop all the packets belonging to the identified interfering flow, thereby blocking such interfering traffic.

The arrangement described herein thus presents a new approach for limiting such effects. A procedure is introduced that runs in the residential gateway (or access point) and keeps track of ongoing transmissions. When new TCP/IP sessions that could deteriorate the quality of the audiovisual stream(s) are detected, the algorithm selectively discards interfering packets. In that way a call admission control function is performed, which does not need specific signaling mechanisms to be introduced in the other terminals of the Wireless LAN, thereby reducing complexity.

In one aspect, a method for admission control in a network adapted to serve a set of stations and manage real time transmission as well as TCP/IP sessions comprises: checking whether sufficient bandwidth is available when a new station joins the network, for new traffic flow associated with said new station without interfering with any ongoing real time transmission in the network; blocking said new traffic flow associated with the new station when sufficient bandwidth is not available; checking whether sufficient bandwidth is available when a new TCP/IP session is being initiated for new traffic flow associated with the new TCP/IP session without interfering with any ongoing real time transmission in the network; and blocking said new traffic flow associated the new TCP/IP session when sufficient bandwidth is not available.

In another aspect, a system for admission control in a network adapted to serve a set of stations and manage real time transmission as well as TCP/IP sessions, comprises an access point configured to: check, when a new station joins the network, whether sufficient bandwidth is available in the network for new traffic flow associated with said new station without interfering with an ongoing real time transmission in the network; block said new traffic flow associated with said new station when the new traffic flow associated with the new station could interfere with an ongoing real-time transmission; check, when a new TCP/IP session is being initiated, whether sufficient bandwidth is available for new traffic associated with said new TCP/IP session without interfering with an ongoing real-time transmission in the network, and block said new traffic flow associated with said new TCP/IP session when said traffic flow associated with said new TCP/IP session could interfere with an ongoing real time transmission.

In another aspect, a communication network adapted to serve a set of stations and manage real time transmission as well as TCP/IP sessions comprises an access point configured to: check, when a new station joins the network, whether sufficient bandwidth is available in the network for new traffic flow associated with said new station without interfering with an ongoing real time transmission in the network; block said new traffic flow associated with said new station when the new traffic flow associated with the new station could interfere with an ongoing real-time transmission; check, when a new TCP/IP session is being initiated, whether sufficient bandwidth is available for new traffic associated with said new TCP/IP session without interfering with an ongoing real-time transmission in the network, and block said new traffic flow associated with said new TCP/IP session when said traffic flow associated with said new TCP/IP session could interfere with an ongoing real time transmission.

In another aspect, a computer program product loadable in a memory of a processor, comprises software code portions for causing the processor to: check, when a new station joins a network, whether sufficient bandwidth is available in the network for new traffic flow associated with said new station without interfering with an ongoing real time transmission in the network; block said new traffic flow associated with said new station when the new traffic flow associated with the new station could interfere with an ongoing real-time transmission; check, when a new TCP/IP session is being initiated, whether sufficient bandwidth is available for new traffic associated with said new TCP/IP session without interfering with an ongoing real-time transmission in the network, and block said new traffic flow associated with said new TCP/IP session when said traffic flow associated with said new TCP/IP session could interfere with an ongoing real time transmission.

In another aspect, a system for controlling a network having a set of stations, comprises an access point configured to: determine whether a new network traffic flow would interfere with an ongoing real-time transmission in the network; and selectively block the new network traffic flow based at least in part on the determination.

In another aspect, a system for controlling a network comprises: means for determining whether a new data traffic on the network would interfere with an ongoing real time transmission in the network; and means for selectively blocking the new data traffic coupled to the means for determining whether a new data traffic on the network would interfere with an ongoing real time transmission in the network.

BRIEF DESCRIPTION OF THE DRAWINGS

The invention will now be described, by way of example only, with reference to the enclosed figures of drawing, wherein.

DETAILED DESCRIPTION OF THE INVENTION

Figure 1:
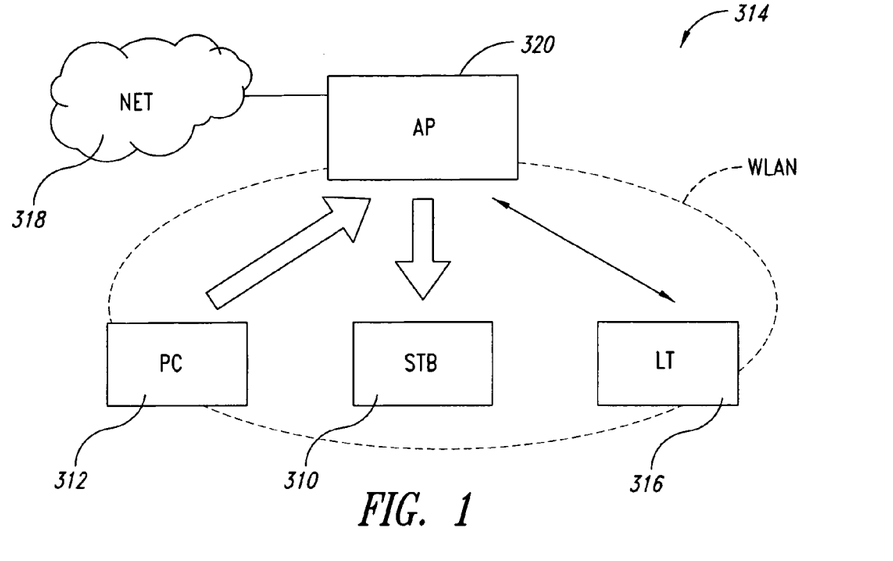
FIG. 1 is a functional block diagram of a WLAN home networking scenario suitable for use with an embodiment of the arrangement described herein.

An exemplary home WLAN networking scenario suitable for use with an embodiment of the invention is depicted in FIG. 1. There, a set-top box STB 310 is shown receiving a stream from a personal computer PC 312 through a Wireless LAN (WLAN) 314. At the same time, a laptop LT 316 is accessing the Internet (NET) 318 through the WLAN 314 access point AP 320, which has a broadband connection.

In this scenario, the TCP/IP (Transport Control Protocol/Internet Protocol) connection could use a significant portion of the radio bandwidth, especially if the Internet connection is broadband. This situation results in a decrease of the bandwidth available for the real-time stream. In a common case where the video source cannot adapt the source-coding rate to the variable channel capacity, a loss of packets is experienced at the receiver, with an unacceptable video quality. This phenomenon may be burst-like and largely unpredictable.

For the sake of completeness, it should be mentioned that embodiments may be employed in home WLAN topologies different from the one shown in FIG. 1. This fact does not derogate from the key issues considered here, which can be applied, e.g., to whatever device plays the role of the WLAN access point (whose function may be incorporated into other components, such as the set-top box STB 310 illustrated in FIG. 1).

A number of solutions have been proposed to solve the problem of robust real time streaming over packet networks (including Wireless LANs).

For instance, enhancing the WLAN MAC layer has been proposed in the draft standard IEEE802.11e so that the medium access probability of a station depends on the priority of the frame it transmits.

Specifically, the IEEE802.11e draft standard adds QoS capabilities to the 802.11 MAC layer by introducing the following features:
- identification of different Traffic Categories (TC): each TC has an associated priority
- Enhanced Distributed Coordination Function (EDCF), which dictates that stations use TC information when accessing the medium, resulting in a modified random access scheme (the probability to get access to the channel is proportional to TC)

- an enhanced polling mechanism that allows mobile stations to request Transmission Opportunities (TXOP), i.e., reserved time intervals that are assigned by a 802.11e access point to a requesting station for transmission
- Traffic Specification (TS) that specify QoS parameters for signaling purposes between the nodes and the access point
- improved ARQ (Automatic Repeat Request) mechanism through delayed and selective acknowledgments
- Forward Error Correction (FEC) for improved error robustness.

To support all the above features, new MAC frame formats are defined as-well as specific signaling in the access point beacon.

Use of the new 802.11e features inevitably requires applications to be provided with means for requesting a specific QoS. The appropriate priority is thus assigned to the frames transmitted within a LAN. This can be done by means of Ethernet frame tagging (IEEE802.1q), which extends the normal Ethernet header with traffic priority tags. The 802.11e MAC layer can then use the 802.1q header to classify the frame to transmit.

Such an arrangement shifts to a higher layer the problem of assigning priorities to Ethernet frames in a LAN. Using 802.11e in a LAN thus requires that all the equipment in the network understands Ethernet 802.1q frames and processes them accordingly. Furthermore, applications have no standard way of requesting a specific priority for their traffic, since no API is universally accepted. It is therefore unclear how applications will use the mechanisms introduced by IEEE802.11e.

To sum up, the IEEE802.11e addendum will introduce new features in the MAC layer to address this problem; however, significant effort will be required to make use of the new QoS features in a standardized way. In fact, a universally accepted Application Programmers' Interface (API) for using the QoS mechanisms available in the link layer does not exist and it will take some time to emerge.

The Reservation Protocol (RSVP) is a signaling protocol at the IP layer, which enables a node to request a certain QoS for a traffic flow. If resources to support such QoS are available in all the intermediate nodes, a path is reserved for that flow. This protocol is part of the so-called "IntServ" QoS Internet architecture but suffers from scalability problems. Routers must store a considerable amount of information for each QoS-enabled flow, which makes RSVP hardly applicable in the "big" Internet. This scalability problem does not hold for a home networking scenario, so RSVP may play a role here. However, recent announcements from certain OS vendors indicate that RSVP adoption is at risk also in restricted environments.

So the key problem remains however, related to the signaling required to set up the LAN resources in such a way that the packets are properly allotted priorities. Such a signaling mechanism is usually implemented at the IP layer or above and results in resources being reserved for specific traffic flows at various nodes in the network. A universally accepted signaling method does not exist nowadays, even if several proposals have been standardized.

In Y. Rasheed, J. Ritchie: "High-Quality Media Distribution in the Digital Home", Intel Technology Journal, Vol. 6, issue 04, Nov. 2002, ISSN 1535-766X an architecture for QoS capability discovery, signaling and mapping on physical resources is discussed which is adapted for use in a home environment. The authors suggest a solution that is implemented at the application level and which makes use of the Universal Plug-n-Play standard (UPnP). UPnP allows service discovery and remote procedure calls by using HTTP (Hyper-Text Transfer Protocol) as a transfer protocol and XML (EXtensive Markup Language) for data representation. By means of this solution, devices—including consumer electronics (CE) equipment—are able to discover the content that is stored in other home network devices and reserve QoS resources in the relevant network elements for streaming purposes.

Although UPnP support is growing in popularity, it is clear that a significant complexity is involved in the software that devices have to incorporate. While this is not a problem for PC's, it may limit the adoption of this architecture in CE equipment. Small footprint implementations are being developed that however come at the price of a slightly reduced functionality, which translates in potential interoperability problems. Another drawback of this approach is that all devices should cooperate according to the proposed architecture. This leaves some questions open related to legacy devices as well as legacy link layer technologies that lack QoS support at the MAC layer (e.g., IEEE802.11b/g but also plain Ethernet).

Figure 2:
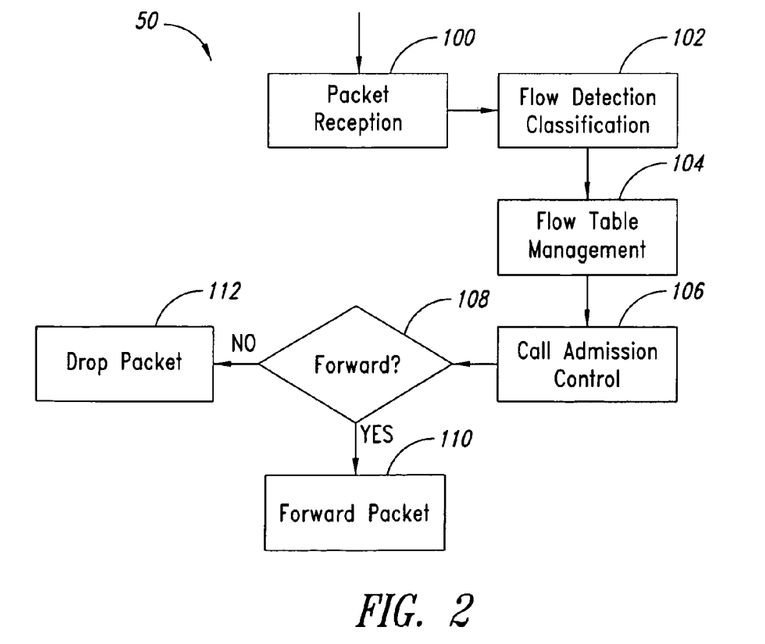
FIG. 2 is a flowchart exemplary of traffic handling at a WLAN access point in an embodiment of the arrangement described herein.

The main steps of an embodiment of the procedure 50 as described herein are summarized in the flow chart of FIG. 2. Essentially the goal pursued by the embodiment is to determine how the access point AP (see the general representation of AP 320 of FIG. 1) can monitor the network traffic and autonomously detect the different traffic flows.

The blocks 100 to 112 are representative of the following steps/actions:
- packet reception 100,
- flow detection classification 102,
- flow table management 104,
- Call Admission Control (CAC) policy 106,
- check as to whether the packet is to be forwarded 108, and
- forwarding 110 or dropping 112 the packet.

In detecting a real time AN (audio/video) streaming flow the access point AP can detect a real time audiovisual stream by:
- inspecting the source and destination MAC headers of the Ethernet frames it forwards
- checking the IP header protocol type—usually UDP (Unreliable Datagram Protocol), but other kinds of encapsulation are also possible, e.g., TCP/HTTP
- checking the UDP payload and recognizing RTP headers
- examining the inter-arrival time statistics of consecutive packets that belong to the same flow as well as the flow average bit rate.

In detecting active stations, an embodiment of the arrangement described herein takes advantage of the fact that according to IEEE802.1d a LAN access point is an Ethernet learning bridge. WLAN stations that are actively sending and receiving traffic can be identified in the AP by looking at the MAC addresses in the bridge forwarding table, which is specified in the bridge MIB. Because of the soft-state nature of this table, the MAC addresses of stations that have not been exchanging frames for a while are deleted after a specified timeout.

Detecting data traffic flows that could potentially interfere with the real time audiovisual stream can be recognized by an access point AP (such as the AP 320 illustrated in FIG. 1) by looking at the content of the Ethernet frames it forwards. Since the dominant protocol is TCP/IP, the access point AP in most cases only needs to recognize this protocol.

For example, whenever a new TCP/IP session is initiated a three-way handshake is performed between the client and the server. The access point AP can easily recognize this sequence, insert the "tuple" {IP source address, IP destination address, TCP source port, TCP destination port} in a list and apply a specific policy to this flow, as identified by the tuple. Another approach for identifying a data flow is based on MAC header information instead of IP header information or a combination of the above.

Conversely, there is no easy way for the access point AP to determine the presence of an interferer, which is possibly located close to a WLAN station.

One possible solution is monitoring of the number of packet retransmissions for a given link. An abrupt increase of such an indicator may correspond to other devices that are transmitting in the same band.

For the purposes of an embodiment of the procedure described herein, the access point AP should record this event and decrease the amount of available bandwidth. When the bad conditions of the wireless link between the access point AP and the WLAN station persist, the amount of frame retransmissions considerably reduces the overall available bandwidth in the WLAN.

Therefore the AP may decide to drop the connection with the specific station and remove the cause of bandwidth waste in case of congestion.

As regards the CAC function 106, once the access point AP has recognized real-time traffic in the network, it calculates its bit rate and, depending on the wireless channel conditions for each of the stations connected, it calculates the remaining available bandwidth.

For example, referring to FIG. 1, the bandwidth occupied by the real-time traffic flow may depend on:
  i) the real time flow bit rate;
  ii) the relative positions of the access point the AP 320 and the personal computer PC 312;
  iii) the relative positions of the access point AP 320 and the set top box STB 310; and
  iv) the presence of other interfering equipment in the same ISM band.

With reference to points ii) and iii), an embodiment of the procedure takes into account the average bit error rate of each of the wireless links, which affects the number of frame retransmissions (and hence the radio bandwidth).

In case of high bit error rates or interference on the downstream wireless link (from the access point AP 320 to the set top box, STB 310 in the example considered), the access point AP 320 may decide to apply a suitable fragmentation threshold so that shorter packets are transmitted that have a smaller retransmission probability.

In any case, by looking at the retransmission rate of the frames (both received and transmitted) the access point AP (such as the access point 320 illustrated in FIG. 1) can estimate the bandwidth that can be made available to other traffic flows.

Given the channel conditions and the estimated average bit rate of a traffic flow, a correction factor may be introduced that takes retransmission probabilities into account. This allows a conservative estimate of the remaining bandwidth.

The available bit rate can be approximated by the access point, e.g., the AP 320 in FIG. 1, as follows:

$$B_A = C - \sum_i B_{R,i} \cdot (1/\eta_{L,i}) - \sum_i B_{D,i} \cdot (1/\eta_{L,i})$$

where C is the channel capacity, $B_{R,i}$ is the bit rate of the i-th real-time flow, $\eta_{L,i}$ is the efficiency of the i-th link (that takes retransmissions into account) and $B_{D,i}$ is the average bit rate of the i-th data flow.

Figure 3:
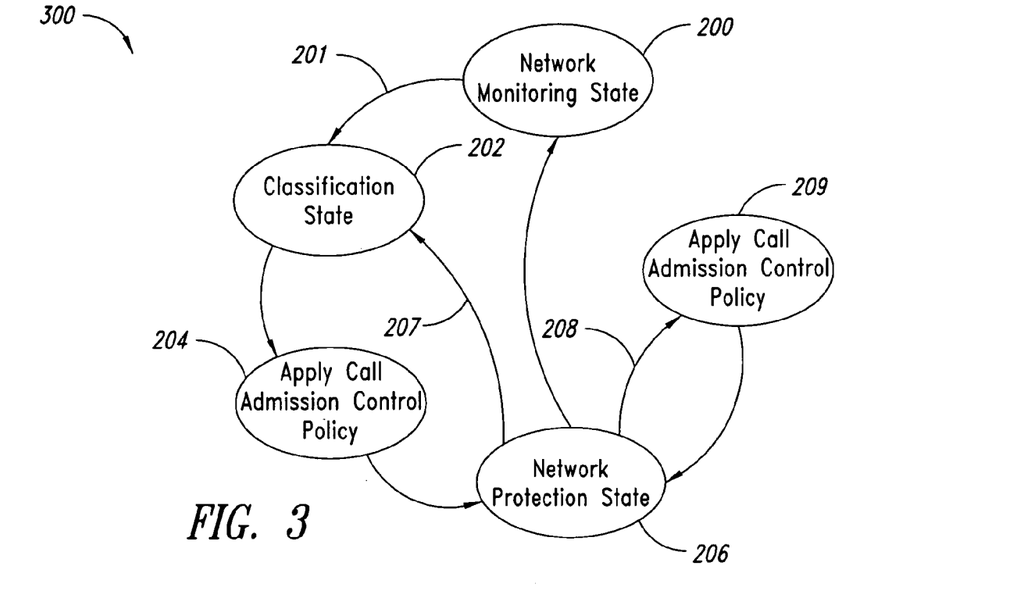
FIG. 3 is a state flow diagram of an embodiment of access point processing.

A state diagram 300 that describes an embodiment of the CAC algorithm on the access point, such as the AP 320 illustrated in FIG. 1, is depicted in FIG. 3.

The access point AP is normally in the network monitoring state 200, where it tracks flows bit rates as well as wireless link conditions. In this state, no limitations to admitted traffic flows are applied.

Once a real time (RT) stream is detected (step 201), the AP enters a classification state 202, where the characteristics of such a flow are estimated (mainly the bandwidth it requires). Then a user-defined call admission control policy is applied (state 204), which can specify if a flow is to be admitted or not.

In the latter case, all the packets belonging to the stream will be discarded (dropped) by the access point AP, thereby freeing some bandwidth. This part of the processing is performed in the network protection state designated 206. In this state the AP keeps monitoring the network and the wireless link conditions, but selectively discards packet that belong to non-admitted flows.

If a new real time stream is activated by a station (in a step 207), the flow classification state 202 is entered again. In the period of time where the new flow is being classified, there is a probability that the bandwidth is not sufficient for both flows and interference effects are experienced.

To avoid this effect, the user-defined CAC for the first flow may dictate that new flows should not even be evaluated for admission.

When all real time flows are terminated, the state machine goes from the network protection state 206 back to the normal network monitoring state 200.

In the network protection state 206, when a non-real time flow is detected (in a step 208), the flow may be admitted to the network or not given the estimated available bandwidth and the call admission control policy. Even in the latter case, the access point AP needs some time to estimate the statistical characteristics of the data flow. This CAC policy is represented in the diagram of FIG. 3 by the state 209, from which the machine switches back to the network protection state 206.

In the case of burst-like downlink data traffic (a common case for Internet browsing sessions), the access point AP may perform traffic shaping by smoothing packet inter transmission times: this requires resources in terms of memory in the AP but has the effect of reducing interference with an audio-visual real time flow.

The effects of packet dropping in the access point AP may be evaluated by considering that, when a traffic flow is not admitted in the network, the access point AP simply does not forward its packets (either towards the wired network or inside the WLAN). However, this does not prevent the station from transmitting data, so the consequences vary depending on the traffic flows that are being denied.

In the case of a data traffic flow, one can take into account the transport protocol characteristics, namely the TCP/IP behavior.

Normally, once a TCP/IP connection has been established, the sender transmits data without waiting for acknowledgements until a transmission window is reached. The transmission rate depends on the ACK (Acknowledgment Message) inter-arrival times.

If ACK packets are dropped, the TCP sender retransmits packets after the retransmission timeout expires.

If no ACKs are received the retransmission timeout is doubled.

After an amount of time in the order of seconds, the TCP/IP connection is finally dropped.

If TCP data packets are dropped, the ACK signaling mechanism also causes retransmissions at the TCP sender, which follow an exponential back-off scheme. Furthermore, the normal transmission rate is reduced.

So, in the case of an ongoing TCP/IP connection, dropping packets causes retransmissions with a frequency that decreases over time. Clearly this will have effects on the user that is requesting the data service (see below for UI aspects).

In case of a TCP/IP connection that is being started, the AP can in any case interrupt the three-way handshake process by dropping either TCP-SYN, TCP-SYN-ACK or TCP-ACK messages. Details of this specific procedure are known in the art (see, e.g., D. Comer: "Internetworking with TCP/IP Volume 1: Principles, Protocols and Architecture", 4th edition, 2000, ISBN 0-13-018380-6).

Figure 4:
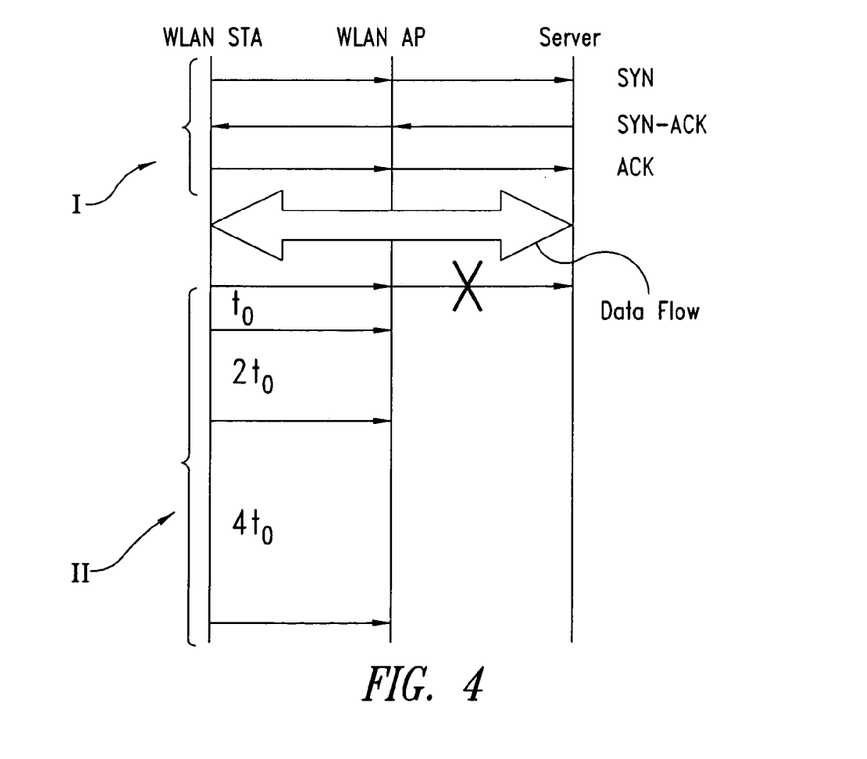
FIG. 4 illustrates initiating data transmissions being blocked in an embodiment of the arrangement described herein.

After some retransmissions, the client will stop the connection establishment process (unless the user manually restarts it). This scenario is depicted in FIG. 4 that represents the process of blocking initiating data transmissions.

In the diagram WLAN STA is indicative of any station in the WLAN considered, while WLAN AP is indicative of the corresponding Access Point AP.

Specifically, I represents as a whole those transactions that would lead to establishing the usual TCP/IP connection. The double pointed arrow is representative of (bilateral) data flow, while II generally represents the effect of the intervention of the access point AP in interrupting the establishment of the TCP/IP connection.

The enforcement of the CAC policy enforcement at the access point AP is effective for data flows. The same may not apply to real-time flows that the AP wants to inhibit, since there is typically no transport control mechanism that uses acknowledgements from the receiver back to the transmitter. The access point AP may send ICMP error messages back to the station that is generating traffic but the consequences depend on the applications that manage the real time data transmission.

When calculating the available bandwidth, the access point AP also takes into account the background traffic that can always be found in a network, such as ARP requests. Such traffic, in fact, is generated by WLAN stations and is not blocked by the access point AP.

Blocking interfering flows by MAC-layer disassociation is another mechanism that the access point AP may use to prevent non-admitted stations from generating traffic. In that way, stations are disconnected by the access point AP and, at least momentarily, stop sending frames.

This method, however, assumes that a driver can properly control the WLAN MAC layer firmware.

Effectiveness of embodiments of the proposed method in networks with 802.11e terminals can be examined by referring to a scenario where the access point AP runs the proposed admission control procedure: consequently it also has IEEE802.11e traffic differentiation support feature in its WLAN card.

Reasonably, one cannot assume that all the terminals/stations that will be connected to the AP have 802.11e support. Legacy 802.11b/g terminals connected to the access point AP can still generate traffic in an unpredictable way.

Without an admission control mechanism like the one proposed in the present invention, high-priority traffic between two 802.11e-enabled devices can be adversely affected by a legacy 802.11b/g terminal. In fact, although IEEE802.11b/g interfering frames have a lower probability of getting access to the channel compared to higher priority traffic generated by 802.11e nodes, they can still occupy the channel for long periods of time, especially when the link conditions are not good (high bit error rate) and therefore many retransmissions are necessary to correctly deliver frames to their destinations.

Figure 5:
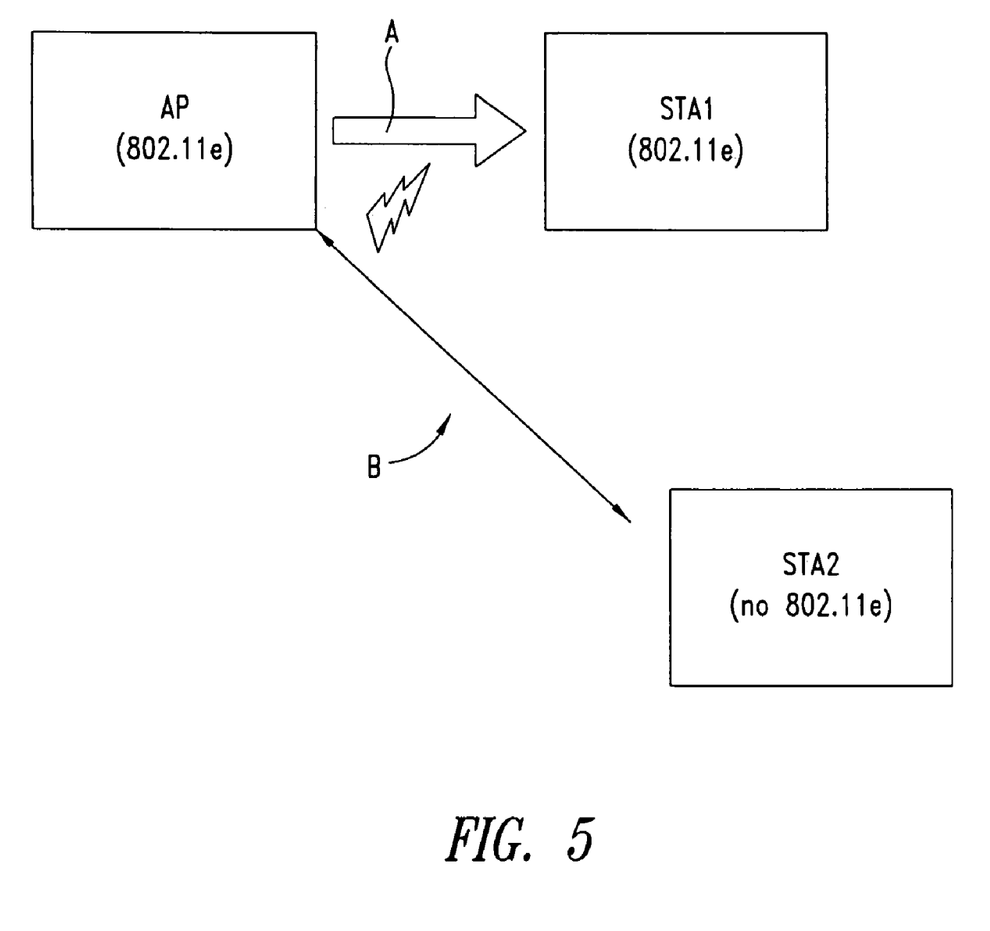
FIG. 5 is a functional block diagram representative of an embodiment of a WLAN scenario where only some devices support IEEE802.11e.

This scenario is depicted in FIG. 5. There possible interaction of an 802.11e access point AP with two stations STA1 and STA2 is shown in connection with high priority, low BER flows represented by a real time flow A and a data flow B, respectively. The station STA1 is an 802.11e station while the station STA2 is a non-802.11e station (e.g., an 802.11b/g terminal).

An embodiment of the admission control procedure described herein is able to autonomously detect the condition where STA2 is interfering with higher priority traffic and consequently disconnect STA2.

Therefore, an embodiment of the admission control procedure described herein can be beneficial also when prospected QoS enhancements in the IEEE802.11 MAC layer will be made available.

Concerning user interfaces, two aspects are particularly significant, namely i) how to configure the access point AP with a user-defined call admission control policy, and ii) how to notify users that their traffic is not admitted.

As regards configuration, commercial access points usually have a small embedded web server that allows a client to configure the main parameters (Service Set Identifier, channel, . . . ). Therefore, adding Web pages to configure the call admission control policy is not an issue. Significant CAC parameters may be:

bandwidth reserved for RT flows max number of simultaneous clients admitted priorities of application flows.

Other ways of configuring such parameters (for example by means of the UPnP protocol or other proprietary mechanisms) are obviously possible.

Notification of Denial of Service

The effects of packets not being forwarded by the access point as a result of a call admission control policy are immediately experienced by the user as a lack of application responsiveness.

To help create a better user experience, the access point AP may send some information back to the station. In case of an HTTP based application, the access point AP can send a redirect message back to the station so that a suitable Web page is shown in the client browser.

Figure 6A:
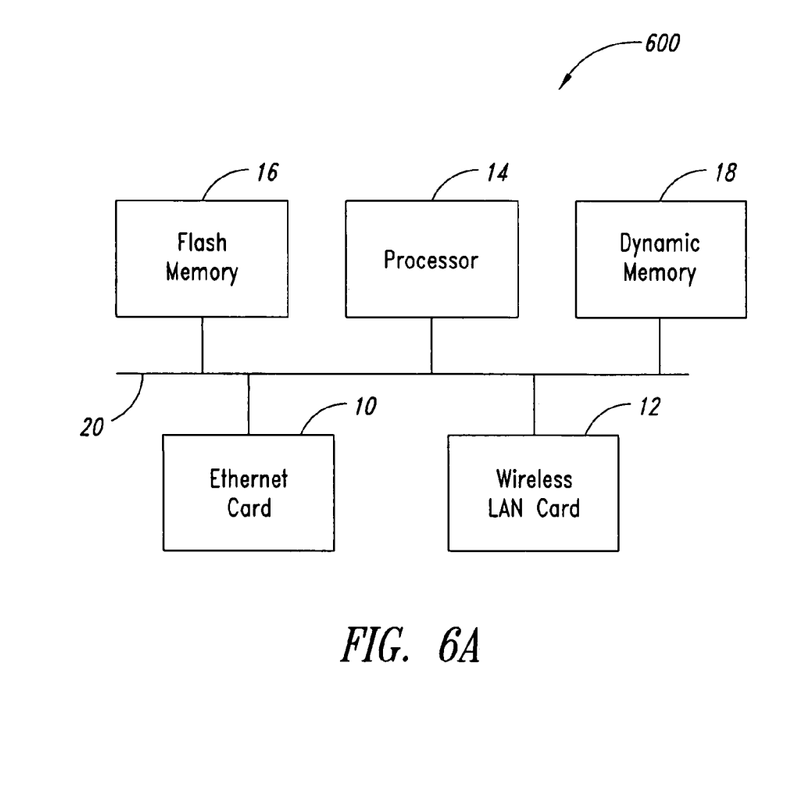
FIGS. 6a and 6b illustrate a simplified functional block diagram of an access point of an embodiment.
Figure 6B:
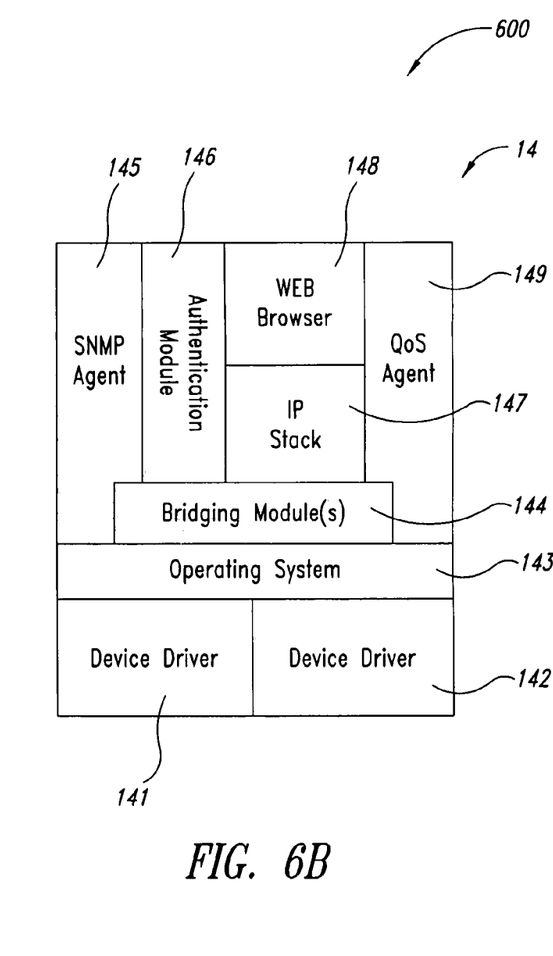
Figure 7:
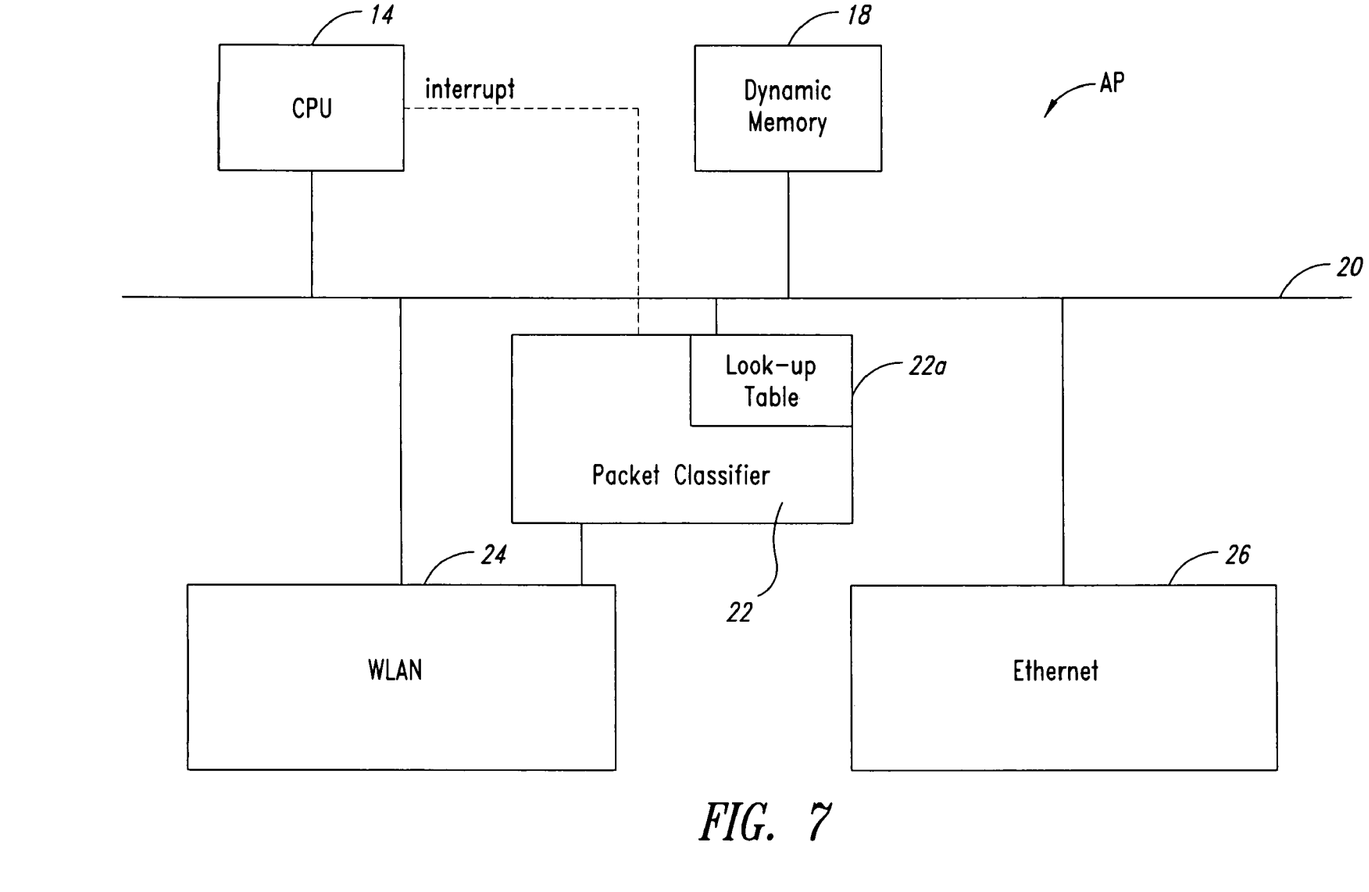
FIG. 7 is a functional block diagram of an embodiment of an access point with a hardware packet classifier.

FIGS. 6a-b and 7 provide some details of possible embodiment of an access point AP according to the arrangement described herein.

Specifically, FIG. 6a is a simplified block diagram of the structure of an embodiment of an access point AP 600 including an Ethernet card 10, one or more Wireless LAN card(s) 12, a CPU 14, a Flash memory 16 and dynamic memory 18. The elements mentioned are usually connected via a bus 20. The WLAN and Ethernet cards 10 and 12 may be connected through a PCI bridge (not shown in the picture for simplicity).

In any case, their typical behavior is transmitting and receiving Ethernet frames from/to a memory (such as the flash memory 16 or the dynamic memory 18) using DMA access and CPU interrupts.

The structure of the CPU 14 (which usually boots an operating system from flash memory upon startup) is highlighted in FIG. 6b. Specifically, device drivers 141 and 142 take care of handling Ethernet frames both in transmission and reception by preparing/checking their headers and copying their payload into data structures specific to an Operating System (OS) 143.

Usually, bridging modules 144 in the access point AP takes care of forwarding frames from one network interface to another.

Furthermore, the AP usually includes an SNMP (Simple Network Management Protocol) agent 145 that enables remote control of the device, an authentication module 146 to give access only to allowed clients, an IP stack 147 (to enable remote monitoring through SNMP) and a Web browser 148 for configuration purposes.

An embodiment of the Call Admission Control procedure described runs as a stand-alone process/module 149 (designated "QoS agent") and controls the behavior of the Ethernet bridge by using information coming from the device drivers.

This can be accomplished by using a socket interface (see, e.g., D. Comer: "Internetworking with TCP/IP Volume 1: Principles, Protocols and Architecture", 4th edition, 2000, ISBN 0-13-018380-6) and private "ioctl" commands.

A QoS agent can also be conceived that does not influence the bridging software but only interacts with the device drivers. In that case, a small modification in the WLAN device driver could enable dropping specific packets under control of the QoS agent.

As indicated, embodiments of the present invention are applicable not only to traditional WLAN access points, but also to such devices as Set-top boxes, TV sets, personal computers or other equipment configured to act as a WLAN access point.

The CAC procedure in the embodiment considered is based on the inspection of the content of each MAC frame by the access point AP. This may turn out to be a heavy task especially for high data rates. Some sort of optimization may thus be introduced. For example, a dedicated hardware block could take care of packet classification by comparing header fields against a look-up-table (LUT).

This hardware block could be programmed by the CPU at boot time and the look up table could be accessible by the CPU through memory mapped I/O.

Events like new flows detected or terminated flows can be signaled to the main CPU by means of interrupts. By accessing the LUT, the CPU can retrieve statistical information about WLAN traffic flows.

A corresponding block diagram is shown in FIG. 7, where references 14, 18, and 20 designate the same elements shown in FIG. 6a, namely the CPU, the dynamic memory and the bus. Reference 22 indicates the packet classifier considered in the foregoing, including a LUT 22a. References 24 and 26 designate the WLAN MAC and PHY layers, and the Ethernet, respectively.

One possible configuration of the LUT 22a is shown in Table 1.

The second flow has not been admitted; therefore each packet whose headers match the second row of the LUT will not be forwarded.

The comparison between the relevant frame header fields and the rows in the LUT can be performed by dedicated hardware in the packet classifier.

An arrangement has been described to protect audiovisual streams from interfering data traffic in a WLAN. Such an arrangement performs call admission control without requiring any signaling among WLAN stations and only runs in the access point. This is a major advantage with respect to the prior art.

In one embodiment, the access point continuously estimates the wireless network conditions and can block data traffic that could interfere with real time streams, according to user selectable policies.

It is once more recalled that the detailed description of a possible application to local area networks (LANs) such as, e.g., a wireless LAN must not be construed in a limiting sense of the scope of embodiments of the invention.

In fact, embodiments may also be adapted for use, e.g., in non-wireless networks (such as the Ethernet), other types of wireless networks (UltraWideBand), or mobile telephone networks including terminals equipped with a WLAN interface. In view of the foregoing, the term "access point" is used herein to designate any point providing access to a network.

Consequently, without prejudice to the underlying principles of the invention, the details and the embodiments may vary, also appreciably, with reference to what has been described by way of example only, without departing from the scope of the invention as defined in the annexed claims.

The term "computer-readable medium" as used herein refers to any medium that participates in providing instructions to a system or a processor for execution. Such a medium may take many forms, including but not limited to, non-volatile media, volatile media, and transmission media. Non-volatile media includes, for example, hard, optical or magnetic disks. Volatile media includes dynamic memory. Transmission media includes coaxial cables, copper wire and fiber optics. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave, or any other medium from which a computer can read.

TABLE 1

Packet classifier look up table structure.

| Flow No. | SRC MAC | DST MAC | SRC IP | DST IP | A/V | SRC port | DST port | admitted |
|---|---|---|---|---|---|---|---|---|
| 1 | 00:08:74:B2:A2:BE | 00:02:2D:68:2D:3C | A | B | yes | 1234 | 1234 | Yes |
| 2 | 00:08:02:6A:75:08 | 00:08:74:B2:A2:BE | C | D | no | X | 80 | No |
| 3 | 00:02:2D:68:2D:3C | 00:08:02:6A:75:08 | B | C | no | X | 80 | Yes |

In the example considered above, the A/V flow No. 1 has been admitted, therefore each packet whose source and destination MAC address, source and destination IP address and ports match the content of the first row of the LUT will be forwarded.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infrared transmitter to convert the data to an infrared signal. An infrared detector coupled to a system bus can receive the data carried in the infrared signal and place the data on system bus. The system bus carries the data to system memory, from which a processor retrieves and executes the instructions. The instructions received by system memory may optionally be stored on storage device either before or after execution by the processor.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for admission control in a network adapted to serve a set of stations and manage real time transmission as well as TCP/IP sessions, comprising:
   classifying, autonomously at an access point, new traffic flow associated with a new station and determining at the access point whether sufficient bandwidth is available when the new station joins the network, for the new traffic flow associated with said new station without interfering with any ongoing real time transmission in the network;
   blocking said new traffic flow associated with the new station when sufficient bandwidth is not available;
   classifying, autonomously at the access point, new traffic flow associated with a new TCP/IP session and determining at the access point whether sufficient bandwidth is available when the new TCP/IP session is being initiated for the new traffic flow associated with the new TCP/IP session without interfering with any ongoing real time transmission in the network; and
   blocking said new traffic flow associated the new TCP/IP session when sufficient bandwidth is not available, wherein determining whether sufficient bandwidth is available comprises determining an available bandwidth on the network as a function of a real time flow bit rate, relative positions of the access point to the network and other stations in the set of stations and a presence of other interfering equipment in a same ISM band.

2. The method of claim 1, further comprising detecting real time audio/video streaming flows in the network by inspecting source and destination MAC headers of forwarded Ethernet frames.

3. The method of claim 1, further comprising:
   configuring the access point as an Ethernet learning bridge; and
   detecting active stations in said set of stations by monitoring MAC addresses in a forwarding table of said Ethernet learning bridge.

4. The method of claim 1, further comprising, when a new TCP/IP session is initiated:
   recognizing a related sequence;
   inserting a respective tuple in a list; and
   applying to a session flow a respective managing policy as identified by said tuple.

5. The method of claim 1, further comprising:
   determining a presence of an interfering flow by monitoring a number of packet retransmissions for a link in said network.

6. The method of claim 1, further comprising:
   determining a remaining available bandwidth in the network when a new TCP/IP session is initiated.

7. The method of claim 1, further comprising:
   calculating a bit rate of recognized real-time traffic in the network; and
   determining remaining available bandwidth as a function of wireless channel conditions for the stations in said set of stations.

8. The method of claim 1, further comprising:
   applying a fragmentation threshold to transmit shorter packets having a smaller retransmission probability in response to high bit error rates on a link between the access point to the network and any of the stations of said set of stations; and
   applying the fragmentation threshold in response to interference on a link between the access point to the network and any of the stations of said set of stations.

9. The method of claim 1, further comprising configuring the access point to the network as a state machine having:
   a network monitoring state, where said access point tracks flow bit rates and wireless link conditions;
   a classification state, where characteristics of a traffic flow are estimated;
   a call admission control policy, to specify when a new traffic flow is to be blocked; and
   a network protection state, wherein said access point monitors said network.

10. The method of claim 1, further comprising:
    performing traffic shaping by smoothing packet inter transmission times in response to incoming burst-like traffic.

11. The method of claim 1, further comprising:
    blocking new traffic by MAC-layer disassociation.

12. The method of claim 1 wherein said network comprises a Wireless local area network.

13. A system for admission control in a network that serves a set of stations and manages real time transmission as well as TCP/IP sessions, the system comprising an access point configured to autonomously:
    determine a remaining available bandwidth in the network as a function of:
      a real time flow bit rate;
      relative positions of said access point and other stations in said set of stations; and
      a presence of other interfering equipment in a same ISM band;
    check, when a new station joins the network, whether sufficient bandwidth is available in the network for new traffic flow associated with said new station without interfering with an ongoing real time transmission in the network by classifying the new traffic flow associated with the new station;
    block said new traffic flow associated with said new station when the new traffic flow associated with the new station could interfere with an ongoing real-time transmission;
    check, when a new TCP/IP session is being initiated, whether sufficient bandwidth is available for new traffic associated with said new TCP/IP session without interfering with an ongoing real-time transmission in the network by classifying the new traffic associated with the new TCP/IP session; and block said new traffic flow associated with said new TCP/IP session when said traffic flow associated with said new TCP/IP session could interfere with an ongoing real time transmission.

14. The system of claim 13 wherein said access point is further configured to detect real time audio/video streaming flows in the network by at least one of:
inspecting source and destination MAC headers of Ethernet frames forwarded;
checking an IP header protocol type;
checking a UDP payload and recognizing RTP headers; and
examining inter-arrival time statistics of consecutive packets that belong to a same flow and a flow average bit rate.

15. The system of claim 13 wherein said access point comprises an Ethernet learning bridge configured to detect active stations in said set of stations by monitoring MAC addresses in a forwarding table of said bridge.

16. The system of claim 13 wherein said access point is further configured to:
recognize, when a new TCP/IP session is initiated, a related sequence;
insert a respective tuple in a list; and
apply a respective managing policy as identified by said tuple to a session flow associated with the new TCP/IP session.

17. The system of claim 13 wherein said access point is further configured to determine a presence of an interfering flow by monitoring a number of packet retransmissions for a link in said network.

18. The system of claim 13 wherein said access point is further configured to determine a remaining available bandwidth in the network when a new TCP/IP session is initiated.

19. The system of claim 13 wherein the access point is configured to:
recognize real time traffic in the network;
calculate a bit rate thereof; and
determine a remaining available bandwidth as a function of a wireless channel condition for the set of stations.

20. The system of claim 13 wherein said access point is further configured to:
apply a fragmentation threshold to transmit shorter packets having a smaller retransmission probability in response to a threshold bit error rate on a link from said access point to a station of said set of stations; and
apply a fragmentation threshold to transmit shorter packets having a smaller retransmission probability in response to interference on a link from said access point to a station of said set of stations.

21. The system of claim 13 wherein said access point is further configured as a state machine having:
a network monitoring state, where said access point tracks flow bit rates and wireless link conditions;
a classification state, where characteristics of flows are estimated;
a call admission control policy, to specify if a new traffic flow is to be blocked; and
a network protection state, wherein said access point monitors said network.

22. The system of claim 13 wherein said access point is further configured to perform traffic shaping by smoothing packet inter transmission times in response to incoming burst-like traffic.

23. The system of claim 13 wherein said access point is further configured to selectively block new traffic by MAC-layer disassociation.

24. The system of claim 13 wherein said access point is associated with a station in said set of stations.

25. The system of claim 13 wherein said access point is associated with at least one apparatus selected from the group consisting of a personal computer, a set top box, a TV set, and a laptop computer.

26. The system of claim 13 wherein said access point includes a dedicated packet classifier configured to perform packet classification by comparing header fields against a look-up-table.

27. A communication network that serves a set of stations and manages real time transmission as well as TCP/IP sessions, the network comprising an access point configured to:
determine a remaining available bandwidth in the network as a function of:
a real time flow bit rate;
relative positions of said access point and other stations in said set of Stations; and
a presence of other interfering equipment in a same ISM band;
check, when a new station joins the network, whether sufficient bandwidth is available in the network for new traffic flow associated with said new station without interfering with an ongoing real time transmission in the network;
selectively block said new traffic flow associated with said new station when the new traffic flow associated with the new station could interfere with an ongoing real-time transmission;
check, when a new TCP/IP session is being initiated, whether sufficient bandwidth is available for new traffic associated with said new TCP/IP session without interfering with an ongoing real-time transmission in the network; and
selectively block said new traffic flow associated with said new TCP/IP session when said traffic flow associated with said new TCP/IP session could interfere with an ongoing real time transmission, wherein the access point is configured as a state machine having:
a network monitoring state, where said access point tracks flow bit rates and wireless link conditions;
a classification state, where characteristics of flows are estimated;
a call admission control policy, to specify if a new traffic flow is to be blocked; and
a network protection state, wherein said access point monitors said network.

28. The communication network of claim 27 wherein the network comprises a wireless local area network.

29. The communication network of claim 27 wherein said access point is further configured to:
recognize, when a new TCP/IP session is initiated, a related sequence;
insert a respective tuple in a list; and
apply a respective managing policy as identified by said tuple to a session flow associated with the new TCP/IP session.

30. The communication network of claim 27 wherein said access point is further configured to determine a presence of an interfering flow by monitoring a number of packet retransmissions for a link in said network.

31. The communication network of claim 27 wherein said access point is further configured to:
recognize real time traffic in the network;
calculate a bit rate thereof; and
determine a remaining available bandwidth as a function of a wireless channel condition for the set of stations.

32. A computer program product loadable in a memory of a processor of an access point to a network, comprising software code portions for causing the processor of the access point to:

classify, when a new station joins the network, new traffic flow associated with the new station, and based at least in part on the classification, determine whether sufficient bandwidth is available in the network for the new traffic flow associated with said new station without interfering with an ongoing real time transmission in the network;

selectively block said new traffic flow associated with said new station when the new traffic flow associated with the new station could interfere with an ongoing real-time transmission;

classify, when a new TCP/IP session is being initiated, new traffic flow associated with the new TCP/IP session, and based at least in part on the classification, determine whether sufficient bandwidth is available for the new traffic associated with said new TCP/IP session without interfering with an ongoing real-time transmission in the network; and selectively block said new traffic flow associated with said new TCP/IP session when said traffic flow associated with said new TCP/IP session could interfere with an ongoing real time transmission, wherein determining whether sufficient bandwidth is available comprises determining a remaining available bandwidth in the network as a function of:

a real time flow bit rate;

relative positions of said access point and other stations in said set of Stations; and a presence of other interfering equipment in a same ISM band.

33. The computer program product of claim 32, wherein the instructions further cause the processor of the access point to operate as a state machine having:

a network monitoring state, where said processor tracks flow bit rates and wireless link conditions;

a classification state, where characteristics of a traffic flow are estimated;

a call admission control policy, to specify when a new traffic flow is to be blocked; and a network protection state, wherein said processor monitors said network.

34. The computer program product of claim 32 wherein the instructions further the processor of the access point to:

recognize, when a new TCP/IP session is initiated, a related sequence;

insert a respective tuple in a list; and apply a respective managing policy as identified by said tuple to a session flow associated with the new TCP/IP session.

35. The computer program product of claim 32 wherein the instructions further cause the processor of the access point to determine a presence of an interfering flow by monitoring a number of packet retransmissions for a link in said network.

36. The computer program product of claim 32 wherein the instructions further cause the processor of the access point to:

recognize real time traffic in the network;

calculate a bit rate thereof; and determine a remaining available bandwidth as a function of a wireless channel condition for the network.

37. A system for controlling a network, comprising:

means for autonomously classifying at an access point to the network a new data traffic on the network, the means for autonomously classifying including a processor configured to determine a remaining available bandwidth in the network as a function of:

a real time flow bit rate;

relative positions of said access point and another station in said set of Stations; and a presence of other interfering equipment in a same ISM band; and means for selectively blocking the new data traffic coupled to the means for autonomously classifying when the new data traffic on the network would interfere with an ongoing real time transmission in the network.

38. The system of claim 37, wherein the new network traffic flow is associated with a new station joining the network.

39. The system of claim 37, wherein the new network traffic is associated with an initiation of a new TCP/IP session.

40. The system of claim 39, wherein the means for autonomously classifying comprises a processor configured to:

recognize, when a new TCP/IP session is initiated, a related sequence; and insert a respective tuple in a list.

41. The system of claim 37 wherein the means for autonomously classifying comprises a processor configured to determine a presence of an interfering flow by monitoring a number of packet retransmissions for a link in said network.

42. The system of claim 37 wherein the means for autonomously classifying comprises a processor configured to:

recognize real time traffic in the network;

calculate a bit rate thereof; and determine a remaining available bandwidth as a function of a wireless channel condition for the set of stations.

43. The system of claim 37 wherein the means for autonomously classifying comprises a processor configured as a state machine having:

a network monitoring state, where said processor tracks flow bit rates and wireless link conditions;

a classification state, where characteristics of a traffic flow are estimated; and a network protection state, wherein said processor monitors said network.

44. The system of claim 37 wherein the means for autonomously classifying comprises a packet classifier.

45. The method of claim 1, further comprising detecting real time audio/video streaming flows in the network by checking an IP header protocol type.

46. The method of claim 1, further comprising detecting real time audio/video streaming flows in the network by checking a UDP payload and recognizing RTP headers.

47. The method of claim 1, further comprising detecting real time audio/video streaming flows in the network by examining inter-arrival time statistics of consecutive packets that belong to a same flow as well as a flow average bit rate.

* * * * *